United States Patent Office.

CHARLES S. LYNCH, OF BOSTON, MASSACHUSETTS.

Letters Patent No. 90,111, dated May 18, 1869.

---

IMPROVED MODE OF UTILIZING THE SLAG OF A ROLLING-MILL FURNACE.

---

The Schedule referred to in these Letters Patent and making part of the same

---

*To all persons to whom these presents may come:*

Be it known that I, CHARLES S. LYNCH, of Boston, in the county of Suffolk, and State of Massachusetts, have made a new and useful invention, which has for its object the Utilizing of the Slag of a Rolling-Mill Furnace; and I do hereby declare the same to be fully scribed as follows:

The cinder, or slag tapped from the puddling, or various other furnaces of a rolling-mill for the making of wrought-iron, has heretofore been considered a waste product, of little or no value, as it has not been made use of to much, if any, practical advantage.

I have discovered that the heat and other useful properties of this cinder, or slag, may be availed of to great advantage.

In doing this, I mix with the cinder, or slag, immediately after its extraction from the furnace, and while it is in a molten, or fluid state, a quantity of pulverized iron-ore.

The proportions of the mixture may be about the same amount by weight of ore as of slag, but I do not confine my invention to these proportions, as some ores may be employed in larger quantities than others, much depending on the condition of the cinder, and the character of the appliances for effecting the mixture.

The method I have adopted for effecting the mixture, has been to pour the ore into the slag, and stir the whole well together, by means of a wooden staff, or stirrer.

A quantity of oxide of manganese, in a pulverized state, may be mixed with the ore preparatory to its introduction into the slag.

I have found that this cinder, or slag, in the state in which it runs from the furnace, very readily combines with various substances considered as detergents of iron.

The oxide of manganese operates both as a detergent and a flux, and therefore becomes very useful in the subsequent treatment of the mixture of slag and iron-ore.

The said mixture afterwards is to be introduced into a blast-furnace, and there subjected to the action thereof, so as to reduce the slag and ore, or extract the iron therefrom in the state of cast-iron.

Another mode of treatment, is to subject the mixture to the action of a puddling-furnace, first charging the mixture into the same, with a quantity of pig-iron, usually in the proportions of two parts by weight of the iron to one part by weight of the mixture.

The result of this employment of the slag with the iron-ore, or with such and manganese, in manner as hereinbefore described, is the obtention of a large amount of metal from the slag, which would otherwise be lost, and the employment of the heat and other properties of the cinder, or slag as it comes from the furnace, to effect a partial reduction of the ore, thus saving the fuel, and heat, and labor which would otherwise be required in the blast-furnace, or the puddling-furnace, to attain a like effect in the reduction of the ore.

I am aware that iron-ores have heretofore been mixed with cast-iron in a molten state, such being described in the United States patent, No. 84,053, dated November 17, 1868; but this has nothing to do with my invention, the purpose of which is to utilize the furnace-slag, or obtain from it the iron in it, and employ the heat and other properties of it in the treatment of iron-ore, both before and after the introduction of the mixture in the blast or puddling-furnace.

I claim, as my invention, the employment of the furnace-slag, or cinder, as described, with iron-ore alone, or with such and a quantity of oxide of manganese, in the manner, and under circumstances, and for the purposes substantially as hereinbefore explained.

CHAS. S. LYNCH.

Witnesses:
R. H. EDDY,
J. R. SNOW.